United States Patent
Oh et al.

(10) Patent No.: US 11,254,309 B2
(45) Date of Patent: Feb. 22, 2022

(54) CRUISE CONTROL SYSTEM AND METHOD FOR VEHICLE

(71) Applicants: Hyundai Motor Company, Seoul (KR); Kia Motors Corporation, Seoul (KR)

(72) Inventors: Ji Won Oh, Hwaseong-si (KR); Jeong Soo Eo, Hwaseong-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 296 days.

(21) Appl. No.: 16/459,346

(22) Filed: Jul. 1, 2019

(65) Prior Publication Data
US 2020/0156636 A1  May 21, 2020

(30) Foreign Application Priority Data

Nov. 20, 2018 (KR) ........................ 10-2018-0143083

(51) Int. Cl.

| | |
|---|---|
| *B60W 30/14* | (2006.01) |
| *B60W 20/15* | (2016.01) |
| *B60W 10/06* | (2006.01) |
| *B60W 10/08* | (2006.01) |
| *B60W 30/18* | (2012.01) |
| *B60W 50/08* | (2020.01) |

(52) U.S. Cl.
CPC .......... *B60W 30/143* (2013.01); *B60W 10/06* (2013.01); *B60W 10/08* (2013.01); *B60W 20/15* (2016.01); *B60W 30/18072* (2013.01); *B60W 50/082* (2013.01); *B60W 2400/00* (2013.01); *B60W 2520/10* (2013.01); *B60W 2540/215* (2020.02); *B60W 2710/0666* (2013.01); *B60W 2710/08* (2013.01); *B60W 2720/106* (2013.01); *B60Y 2200/92* (2013.01)

(58) Field of Classification Search
CPC .... B60W 30/143; B60W 20/15; B60W 10/06; B60W 10/08; B60W 30/18072; B60W 50/082; B60W 2540/215; B60W 2720/106; B60W 2710/0666; B60W 2710/08; B60W 2400/00; B60W 2520/10; B60W 30/1882; B60W 20/11; B60W 30/18127; B60W 2720/10; B60W 30/14; B60W 40/105; B60W 2530/145; B60W 2710/0655; B60Y 2200/92; B60Y 2300/18066; Y02T 10/62; Y02T 10/40; Y02T 10/60; Y02T 10/84; G05D 1/0061; G05D 1/0223
See application file for complete search history.

(56) References Cited

U.S. PATENT DOCUMENTS

2009/0321165 A1* 12/2009 Haug .................... B60W 10/08
   180/65.275
2015/0066327 A1*  3/2015 Syed ................... B60W 30/143
   701/93

* cited by examiner

*Primary Examiner* — Brian P Sweeney
(74) *Attorney, Agent, or Firm* — Slater Matsil, LLP

(57) ABSTRACT

A cruise control system capable of: determining, by a controller, whether the vehicle is in a cruise mode-on state; determining, by the controller, an operation mode of the vehicle selected by a driver; and when it is determined that the vehicle is in the cruise mode-on state, performing, by the controller, cruise control of the vehicle for the operation mode selected by the driver, and a method therefor. Herein, the operation mode includes an eco mode which performs driving control prioritizing fuel consumption reduction.

20 Claims, 1 Drawing Sheet

CRUISE CONTROL SYSTEM AND METHOD FOR VEHICLE

CROSS REFERENCE TO RELATED APPLICATION

The present application claims priority to Korean Patent Application No. 10-2018-0143083, filed Nov. 20, 2018, the entire contents of which is incorporated herein for all purposes by this reference.

BACKGROUND

Field

The present disclosure relates generally to a cruise control system and method for a vehicle.

Description of the Related Art

In recent years, cruise control, which is one of convenience functions, has been widely applied in vehicles.

Cruise control is a function in which when a driver sets the speed he/she desires during driving through a simple operation with a button, a switch, or the like, the vehicle speed is automatically controlled using the speed set by the driver as a target speed.

Furthermore, there is a system which is known as an adaptive cruise control (ACC) system. Usually, such an ACC system controls the vehicle speed at the target speed and performs acceleration and deceleration control of a vehicle depending on the driving environment.

SUMMARY

One aspect of the present invention provides a cruise control system and method for a vehicle, wherein cruise control is possible for various driving situations and operation modes of the vehicle, and fuel efficiency is further improved during cruising.

Another aspect of the present invention provides a cruise control system for a vehicle, the system including: a first input unit provided for a driver to select and input cruise mode on and off of the vehicle; a second input unit provided for the driver to select and input an operation mode of the vehicle; and a controller receiving signals based on driver inputs from the first input unit and the second input unit to determine on and off states of a cruise mode and the operation mode selected by the driver and performing cruise control of the vehicle based on the operation mode selected by the driver in a cruise mode-on state, wherein the operation mode includes an eco mode which performs driving control prioritizing fuel consumption reduction.

Still another aspect of the present invention provides a cruise control method for a vehicle, the method including: determining, by a controller, whether the vehicle is in a cruise mode-on state; determining, by the controller, an operation mode of the vehicle selected by a driver; and when it is determined that the vehicle is in the cruise mode-on state, performing, by the controller, cruise control of the vehicle based on the operation mode selected by the driver, wherein the operation mode includes an eco mode which performs driving control prioritizing fuel consumption reduction.

Thus, the cruise control system and method for a vehicle according to embodiments of the present invention can perform cruise control for various driving situations and operation modes of the vehicle, and on-road fuel efficiency can be improved during cruising in the eco mode.

Furthermore, control for following the target speed in the acceleration requiring situation is binarized for each mode, thus making it possible to perform natural speed-following control through the mitigated acceleration force.

BRIEF DESCRIPTION OF THE DRAWINGS

The above and other aspects, features and other advantages of the present invention will be more clearly understood from the following detailed description when taken in conjunction with the accompanying drawings, in which.

DETAILED DESCRIPTION OF EMBODIMENTS

Figure 1:
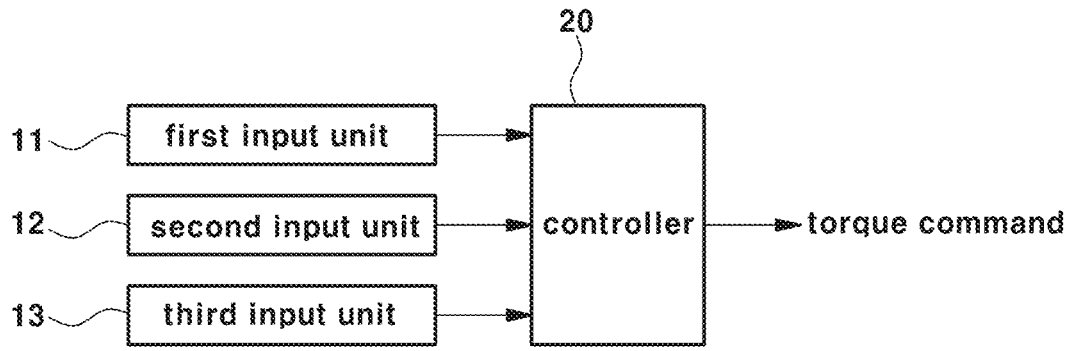
FIG. 1 is a block diagram showing configuration of a cruise control system for a vehicle according to an embodiment of the present invention.

Hereinbelow, embodiments of the present invention will be described in detail with reference to the accompanying drawings such that the invention can be easily embodied by one of ordinary skill in the art to which this invention belongs. However, the present invention is not limited to the embodiments described herein but may be achieved in other ways.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

In one implementation of an adaptive cruise control (ACC) system, a throttle valve, a brake, transmission, and the like of the vehicle are automatically controlled depending on the position of a lead vehicle, the distance to the lead vehicle, and the like detected by radar mounted on the front of the vehicle such that appropriate acceleration and deceleration of the vehicle is achieved, whereby an appropriate distance to the lead vehicle is maintained.

Such an ACC system performs constant driving control following the target speed in the absence of the lead vehicle and performs inter-vehicle distance control to maintain the distance to the lead vehicle in the presence of the lead vehicle.

The term "inter-vehicle distance control" refers to as generation and control of driving/braking torque of the vehicle so as to maintain a safety distance by measuring the distance to the lead vehicle.

For example, when the distance to the lead vehicle is reduced to a value within a set safety distance, the vehicle speed is reduced by using a braking device to increase the distance to the lead vehicle, thus maintaining the safety distance.

The above-described ACC system generally includes an inter-vehicle distance sensor such as a radar sensor, an ultrasonic sensor, and the like, a vehicle control device such as an engine, a motor, an ESP, and the like, and a controller for control calculation.

In recent years, the cruise control function has become popular as standard on many models of vehicles, and the application rate of cruise control is higher in a hybrid electric vehicle (HEV) in which electronic control of driving torque is essential.

Meanwhile, an HEV in which fuel efficiency is important has two or more operation modes, for example, one of which is an eco mode or a mode in which fuel efficiency can be maximized, and the other is a normal mode and or sports mode which is more meaningful to drivability and mobility.

Furthermore, in an HEV, the behavior of an engine, a motor, and transmission, which are driving sources of the vehicle, is differentiated depending on operation modes to determine fuel efficiency and drivability. In an implementation, the operation mode is limited only to a mode in which a driver directly applies driving input via a pedal, and there is no difference between operation modes to be applied for the cruise control function.

It can be understood that this is because while fuel efficiency and drivability can be changed when the vehicle is accelerating or decelerating, the vehicle speed is constantly maintained at the target speed in cruise control and thus there is little need to apply the difference between modes.

However, in actual operation of the vehicle, various speed variation situations may occur, such as when the target speed, which is the speed set by the driver, is changed while the vehicle is driving in a cruise mode, when the cruise mode is resumed after deceleration due to a driver's brake pedal operation, when the cruise mode is resumed after passing a nearby vehicle due to a driver's accelerator pedal operation, and the like, and there in no known countermeasure for each mode in this regard.

Embodiments of present invention relate to a cruise control system and method for a vehicle, which can be used for cruise control in a hybrid electric vehicle (HEV).

Furthermore, embodiments of the present invention provide a system and method for improving on-road fuel efficiency in an eco mode through control based on optimal operating line (OOL) information of an engine.

Furthermore, embodiments of the present invention can find application in improvement of fuel efficiency to cope with variable speed control in adaptive cruise control as well as in a section in which a target speed is varied by a driver in simple cruise control.

One implementation of cruise control is performed in such a manner that a torque command of a vehicle driving source is controlled to allow an actual vehicle speed follows a set target speed on the basis of a driver's operation input indicating that the driver wants to perform cruise control during vehicle driving.

On the other hand, in embodiments of the present invention, a method of performing cruise control by generating a torque command for an eco mode which replaces the above torque command is applied on the basis of operation mode input information by a driver.

Hereinafter, embodiments of the present invention will be described in detail with reference to the drawings.

Figure 2:
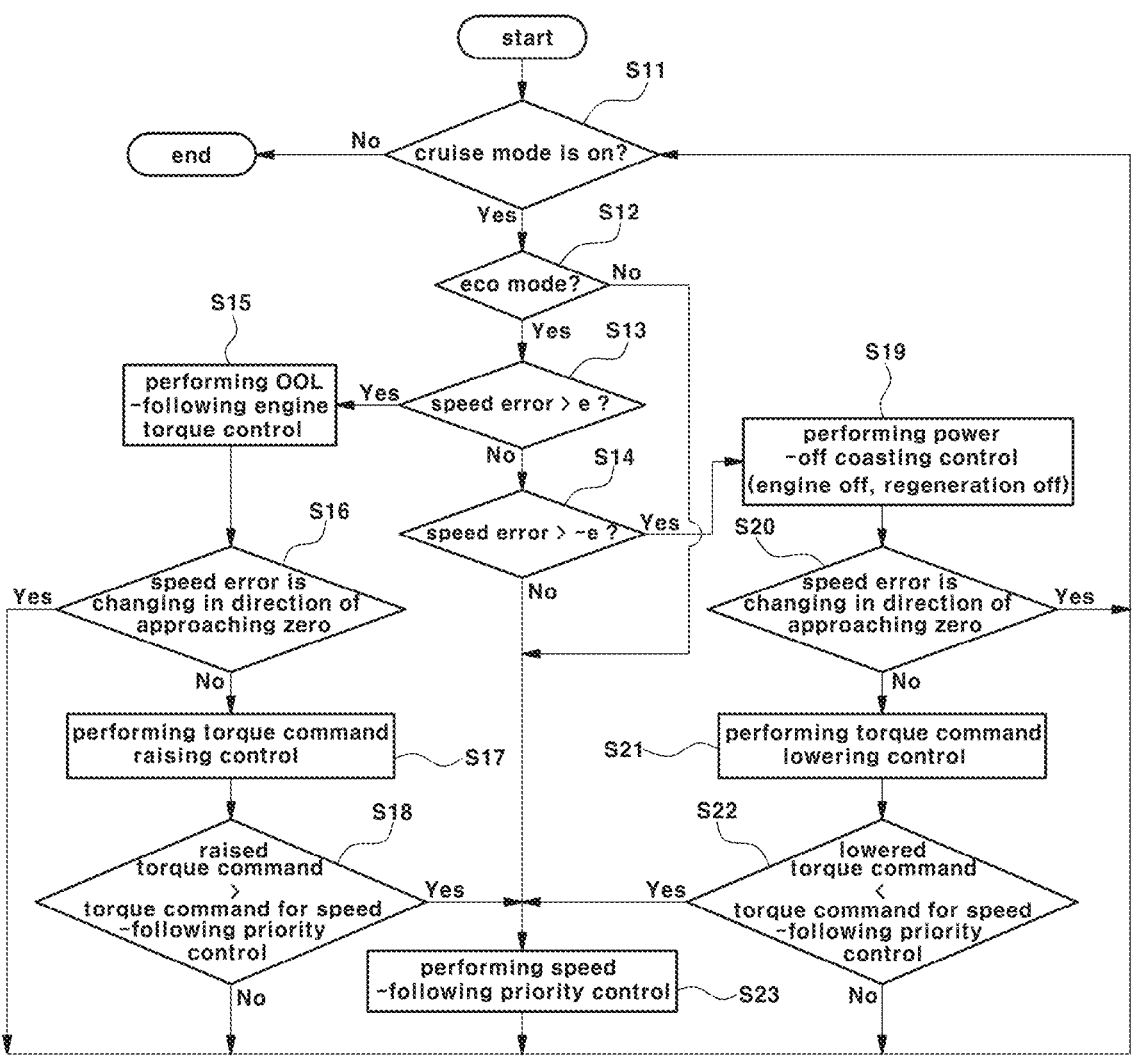
FIG. 2 is a flowchart showing a cruise control method for a vehicle according to an embodiment of the present invention.

FIG. 1 is a block diagram showing configuration of a cruise control system for a vehicle according to an embodiment of the present invention, and FIG. 2 is a flowchart showing a cruise control method for a vehicle according to embodiments of the present invention.

As shown in the drawings, the cruise control system according to the embodiment of the present invention includes a first input unit 11 provided for a driver to select and input cruise mode on and off, a second input unit 12 provided for the driver to select and input an operation mode, and a controller 20 for receiving signals indicative of driver inputs from the first input unit 11 and the second input unit 12 and generating and outputting a torque command for the operation mode selected by the driver in the cruise mode-on state.

Herein, the first input unit 11 and the second input unit 12 may be buttons or switches provided to be operable by the driver in the vehicle.

For example, the first input unit 11 may be a cruise button operable by the driver to turn the cruise mode on or off, while the second input unit 12 may be an operation mode selection button operable by the driver to select one of predetermined operation modes.

Furthermore, the cruise control system according to the embodiment of the present invention further includes a third input unit 13 provided to enable the driver to set and input a target speed in the cruise mode-on state. The third input unit 13 may also be a button or a switch provided to be operable by the driver in the vehicle.

As mentioned above, the third input unit 13 may be a button or a switch separately provided from the first input unit 11. However, instead of separately providing the third input unit 13, when the first input unit 11 is operated by the driver in a predetermined manner, it is possible for the driver to simultaneously select the cruise mode on and set the target speed (speed selection, speed up/down change, and the like).

Furthermore, the controller 20 is provided to receive a signal indicative of a driver input from the third input unit 13 so as to recognize the driver input or operation state. Even when the first input unit replaces the third input unit as described above, the controller 20 receives the signal from the first input unit 11 to recognize the driver input or operation state.

In addition to the buttons and switches, input means or operation means may be adopted without any particular limitations as the first input unit 11, the second input unit 12 and further the third input unit 13 as long as it can input a signal indicative of driver's operation when the driver performs the predetermined operation.

Furthermore, in the embodiment of the present invention, the operation mode may include an eco mode which performs driving control prioritizing a reduction in fuel consumption of the vehicle and may include any type of fuel economy mode instead of the eco mode.

Furthermore, the operation mode may further include a normal mode which is distinguished from the eco mode.

Meanwhile, the controller 20 receives the signals indicative the driver inputs from the first input unit 11, the second input unit 12, and the third input unit 13, and when the cruise mode is turned on, performs driving control for the operation mode selected by the driver, for example, predetermined cruise control for the operation mode.

Herein, a cruise control process for the operation mode includes a predetermined cruise control process corresponding to the eco mode (or any type of fuel economy mode). The cruise control process for the operation mode performed by the controller 20 when the cruise mode is turned on will be described with reference to FIG. 2.

In FIG. 2, the eco mode may be a mode which prioritizes fuel efficiency in an HEV and may be replaced by any type of fuel economy mode as described above.

The fuel economy mode is also a mode which performs driving control prioritizing fuel consumption reduction and thus can be included in a wide range of eco mode category.

First, in embodiments of the present invention, the controller 20 receives the signal indicative of the driver input from the first input unit 11 to determine whether the driver has turned on or off the cruise mode (S11) and when the driver turns on the cruise mode, performs subsequent steps shown in FIG. 2.

When the driver turns on the cruise mode through the first input unit 11, for example, when a cruise mode-on state is entered, the operation mode selected by the driver through the second input unit 12 is determined in a subsequent step (S12).

Herein, the cruise mode on-state is a state in which the driver has already set the vehicle speed he/she desires during driving, for example, the target speed, through the third input unit 13.

When it is determined in S11 that the driver has turned off the cruise mode, the controller 20 terminates the cruise control process according to embodiments of the present invention.

Furthermore, the controller 20 turns off the cruise mode when a predetermined cruise cancellation condition is satisfied in the cruise mode on-state, regardless of the determination of the cruise mode on and off by the driver input (operation) and in this case, terminates the cruise control process according to embodiments of the present invention as in the case of the cruise mode off by the driver input.

In embodiments, the cruise cancellation condition set by the controller may be the same as a typical cruise cancellation condition.

For example, the cruise cancellation condition is set such that when detecting or determining a speed difference due to a brake pedal input or excessive load, gear change, dissatisfaction of a battery state of charge (SOC) condition, driver's willingness to pass (accelerator pedal input), or the like, the controller 20 determines that the cruise cancellation condition is satisfied.

Furthermore, in the cruise mode on-state, the controller 20 determines from the signal of the second input unit 12 whether the operation mode selected by the driver at present is the eco mode (or any type of fuel economy mode) and when the operation mode is the eco mode, performs eco-mode cruise control with fuel efficiency priority.

However, when a mode other than the eco mode is selected among the operation modes, speed-following priority control in S23 is performed.

In embodiments, the speed-following priority control means a typical cruise control system for controlling the vehicle speed so as to follow the target speed and means generating a driving torque command for following the target speed as much as possible on the basis of speed error and vehicle model.

The driving torque command means a torque command for the vehicle driving source, for example, an engine torque command and a motor torque command in the case of an HEV.

Thereafter, when the operation mode selected by the driver is the eco mode, the controller 20 determines whether a current vehicle state is a situation requiring acceleration or a situation requiring deceleration on the basis of calculated speed error (S13 and S14).

Herein, the speed error can be defined as a "target speed−current vehicle speed".

In this case, when the speed error is a positive (+) value, it is a situation in which vehicle acceleration is required, and when the speed error is a negative (−) value, it is a situation in which vehicle deceleration is required.

In determining an acceleration requiring situation or a deceleration requiring situation, the controller 20 determines whether to perform eco-mode cruise control through comparison with a threshold value in addition to determining whether the speed error is the positive value or the negative value.

S13 and S14 performed by the controller 20 in FIG. 2 are processes of determining whether the speed error is the positive value or the negative value to distinguish the acceleration requiring situation from the deceleration requiring situation and further comparing the speed error with the threshold value to determine whether to perform eco-mode cruise control.

In embodiments of the present invention, "e", which is a first threshold value, is used as the threshold value in S13, and "−e", which is a second threshold value, is used as the threshold value in S14.

Herein, "e" is a constant which is set to the positive value, and thus the first threshold value "e" is a positive threshold value set to the positive (+) value and the second threshold value "−e" is a negative threshold value set to the negative (−) value.

In S13 according to embodiments of the present invention, when the speed error is compared with "e" and the speed error is the positive value greater than "e" (speed error>e), the controller performs S15 and subsequent steps.

Furthermore, in S13, when the speed error is equal to or less "e" (speed error≤e), the controller 20 compares the speed error with "−e" in S14 and when the speed error is the negative value less than "−e" (speed error<−e), performs S19 and subsequent steps.

On the other hand, when the speed error is equal to or greater than "−e" and equal to or less than "e" (−e≤speed error≤e), the controller 20 performs a typical cruise control, for example, speed-following priority control in S23.

For example, the value of "e" may be set to 2 km/hr.

The case where the speed error becomes greater than "e" or becomes less than "−e" during driving in the cruise mode refers to a case where the driver changes the target speed, a case where the driver steps on a brake pedal to decelerate the vehicle and then resumes the cruise mode, a case where the driver steps on an accelerator pedal to pass another vehicle and then resumes the cruise mode, and the like.

Meanwhile, when the speed error is greater than "e" and less than "−e" in S13 and S14, the controller 20 performs eco-mode cruise control. During eco-mode cruise control, one of the following two methods is selected and used to make the speed error reach zero.

In embodiments, as the two methods, engine torque control for vehicle acceleration and power-off coasting control for vehicle deceleration are performed. When the speed error is the positive value greater than the first threshold value "e", the controller 20 performs engine torque control for vehicle acceleration (S15). When the speed error is the negative value less than the second threshold value "−e", the controller 20 performs power-off coasting control for vehicle deceleration (S19).

During the engine torque control for vehicle acceleration, engine torque control based on the OOL is performed. Herein, a motor is turned off and torque of the motor (drive motor) is not used, such that the vehicle is accelerated only by engine torque.

Herein, the controller 20 generates engine torque of the OOL for vehicle acceleration as a torque command and controls engine drive in accordance with this command.

On the other hand, during power-off coasting control, the engine is turned off while motor regeneration is turned off, such that neither the engine nor the motor is used and the vehicle is decelerated only by drive resistance.

As described above, the motor is not used in both engine torque control based on the OOL and power-off coasting control. The reason for this is to prevent energy consumption due battery charging and discharging, and such a control method is more effective in a parallel HEV than a power-split HEV.

In the following description, engine torque control based on the OOL will be referred to as "OOL-following engine torque control".

Thereafter, during OOL-following engine torque control for vehicle acceleration in S15 and power-off coasting control for vehicle deceleration S19, the controller 20 checks whether the speed error is in a converging state in which speed error is changing in a direction of approaching zero (S16 and S20).

In embodiments, it is checked whether the absolute value of the speed error is decreasing during OOL-following engine torque control and power-off coasting control. If the absolute value of the speed error is increasing, it means that the speed error is changing in a diverging direction rather than the direction of approaching zero.

Herein, the fact that the speed error approaches zero or changes in the direction of approaching zero means that the current vehicle speed approaches the target speed or changes in a direction of approaching the target speed.

Furthermore, when the target speed is higher than the current vehicle speed, only when the vehicle is accelerated, the speed error changes in the direction of approaching zero (for example, the direction in which the current vehicle speed approaches the target speed) only when vehicle deceleration is performed. Conversely, when the target speed is lower than the current vehicle speed, the speed error changes in the direction of approaching zero only when vehicle deceleration is performed.

If acceleration or deceleration of the vehicle is very small and time for the vehicle speed to reach the target speed becomes long, the function of cruise control may be lost. Thus, the controller 20 is set to determine that convergence is taking place only when the current vehicle speed approaches the target speed in a region equal to or greater than a predetermined constant acceleration or deceleration.

Thereafter, when it is determined in S16 and S20 that the speed error is not approaching zero, for example, when the speed error is in a diverging state in which the vehicle speed is not approaching the target speed and a difference value between the two speeds (the absolute value of the speed error) becomes larger, adjusting of the torque command is performed (S17 and S21).

In embodiments, this is to adjust the torque command of the vehicle driving source, when the speed error is not approaching zero but changing in the diverging direction during OOL-following engine torque control, torque command raising control in S17 is performed.

On the other hand, when the speed error is not approaching but changing in the diverging direction during power-off coasting control, torque command lowering control in S21 is performed.

When it is determined in S16 and S20 that the speed error is changing in the direction of approaching zero or has reached zero during OOL-following engine torque control and power-off coasting control, the controller 20 maintains a current control state without adjusting the torque command and then returns to S11 of FIG. 2.

The fact that the speed error is not changing in the direction of approaching zero during OOL-following engine torque control and power-off coasting control means that the driving torque command at present is inadequate.

Accordingly, when the speed error is not changing in the direction of approaching zero (the absolute value of the speed error gradually increases, for example, the speed error changes in the diverging direction) during OOL-following engine torque control, an additional vehicle acceleration force is required, and thus the controller 20 raises the engine torque command in S17 and generates an engine torque command higher than that of the previous OOL.

During OOL-following engine torque control, the motor is turned off. However, during engine torque command raising control after the speed error is determined to be diverging, it is set to use engine torque and motor torque together for vehicle acceleration without maintaining a motor off condition.

Herein, a distribution ratio of engine torque and motor torque during torque command raising control is determined in consideration of the battery SOC, the system efficiency, the torque limit, and the like in combination.

Furthermore, when the speed error is not changing in the direction of approaching zero during power-off coasting control (the absolute value of the speed error gradually increases, for example, the speed error changes in the diverging direction), and an additional vehicle deceleration force is required, and thus the controller 20 stops power-off (engine off and motor regeneration off) coasting in S21 and generates a motor regeneration torque command to lower the torque command.

Herein, the motor regeneration torque command is a negative torque command for the motor which is the vehicle driving source, and thus the fact that the torque command is lowered means that the torque command for the vehicle driving source is generated in a negative direction (lowered in the negative direction).

As a result, the additional vehicle deceleration force is generated by motor regeneration, and the speed error (absolute value) is gradually reduced due to vehicle deceleration.

When the controller 20 determines the amount by which the torque command is raised during torque command raising control and the amount by which the torque command is lowered during torque command lowering control, it is possible to employ a feedback method of determining the raising or lowering amount to make the speed error reach zero using the speed error as feedback information, or a feedforward method of determining the raising or lowering amount on the basis of gradient information of the road on which the vehicle is driving and set generated torque model information Next, the torque command during S13 to S16 is a torque command used for eco-mode cruise control to perform driving control which prioritizes fuel consumption reduction. However, when the torque command is raised in S17 or the torque command is lowered in S21, the value of the raised or lowered torque command may become greater or less than the value of the torque command used for normal-mode cruise control, for example, a torque command for speed-following priority control, thus occurring a reversal phenomenon.

When there occurs such a reversal phenomenon in which the value of the raised or lowered torque command becomes greater or less than the value of the torque command used for normal-mode cruise control, the value of the torque command for eco-mode cruise control is no longer meaningful. Accordingly, eco-mode cruise control is terminated and then switched to normal-mode cruise control, thus performing speed-following priority control.

In embodiments, referring to FIG. 2, in S18, the controller 20 compares the raised torque command with the torque command for speed-following priority control. In S22, the controller 20 compares the motor regeneration torque command as the lowered torque command with the torque command for speed-following priority control.

Furthermore, when the lowered torque command is greater than the torque command for the speed-following priority control (the torque command for normal-mode cruise control) in S18, the controller 20 switches from eco-mode cruise control to normal-mode cruise control to perform speed-following priority control in 23.

Furthermore, the motor regeneration torque command is smaller than the torque command for speed-following priority control (the torque command for normal-mode cruise control) in S22, the controller switches from eco-mode cruise control to normal-mode cruise control to perform speed-following priority control in S23.

Herein, the lowered torque command which is the motor regeneration torque command is the negative value. Accordingly, the fact that the lowered torque command as the negative value is smaller than the torque command for speed-following priority control means that the absolute value of the lowered torque command is greater than the torque command for the speed-following priority control.

Furthermore, when the raised torque command is equal to or less than the torque command for speed-following priority control or the lowered torque command is equal to or greater than the torque command for speed-following priority control, the current control state is maintained and the process returns to S11.

Furthermore, regardless of determination results of S18 and S22, for example, regardless of whether the reversal phenomenon of the torque command for eco-mode cruise control occurs, the torque command for normal-mode cruise control (torque command for speed-following priority control) has to always be calculated by the controller 20 together with the torque command for eco-mode cruise control.

However, when eco-mode cruise control is effective, for example, when the raised torque command is equal to or less than the torque command for speed-following priority control or when the lowered torque command is equal to or greater than the torque command for speed-following priority control, the torque command for normal-mode cruise control is ignored.

However, when it is determined in S18 and S22 that the reversal phenomenon has occurred between the torque command for eco mode and the torque command for normal mode, the torque command for eco-mode cruise control is ignored and the torque command for normal-mode cruise control is adopted and used as a control command.

Conversely, even when the torque command for normal-mode cruise control is adopted and used (when speed-following priority control is performed), if the calculated torque command for eco-mode cruise control enters a range between zero and engine torque of the OOL, the controller 20 returns to the eco mode and adopts and uses the torque command for eco-mode cruise control.

Furthermore, after returning to S11, S12, and S13 in S23, the controller performs eco-mode cruise control in S15, S17, S19, or S21, and herein, the torque command for eco-mode cruise control is adopted and used again.

Furthermore, when the driver switches the operation mode in the cruise mode on-state, the cruise control is also switched and operated based on the switched operation mode at any time.

Furthermore, when switching between the torque command for eco-mode cruise control and the torque command for normal-mode cruise control takes place, a filter such as a rate limiter or the like for limiting the inclination of a change in command value to prevent generation of a discontinuous point of the command value may be used.

As described above, the cruise control system and method for a vehicle according to embodiments of the present invention are described in detail. According to embodiments of the present invention, it is possible to improve on-road fuel efficiency during cruising in the eco mode.

Furthermore, due to the general characteristics of the driver using the eco mode, the behavior of accelerating the engine speed through downshifting is often burdensome. In view of this, control for following the target speed in the acceleration requiring situation is binarized for each mode, thus making it possible to perform natural speed-following control through the mitigated acceleration force.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A cruise control system for a vehicle, the system comprising:
    a first input unit configured to receive a driver's input of cruise mode on and off of the vehicle;
    a second input unit configured to receive the driver's input of an operation mode of the vehicle, wherein the operation mode includes an eco mode for performing driving control prioritizing fuel consumption reduction; and
    a controller configured to:
        receive signals indicative of driver inputs from the first input unit and the second input unit to determine on and off states of a cruise mode and the operation mode selected by the driver and performing cruise control of the vehicle based on the operation mode selected by the driver in a cruise mode-on state,
        when the cruise mode on and the eco mode are selected by the driver, compare a speed error with a first threshold value that is a predetermined positive (+) threshold value; wherein the speed error a value obtained by subtracting a current vehicle speed from a target speed;
        when the speed error is a positive value greater than the first threshold value, perform engine torque control for vehicle acceleration, wherein the controller is configured to generate and output engine torque of an optimal operating line (OOL) as an engine torque command during the engine torque control; and
        turn off a motor as a vehicle driving source during the engine torque control such that the vehicle is accelerated only by the engine torque.

2. The system of claim 1, wherein the operation mode further includes a normal mode for controlling a vehicle speed to follow a target speed set by the driver in the cruise mode-on state, and
wherein when it is determined from the signal of the second input unit that the driver has selected the normal mode, the controller configured to generate a torque command of the vehicle driving source for vehicle speed control following the target speed, thus performing normal-mode cruise control.

3. The system of claim 1, wherein when the speed error is equal to or less than the first threshold value, the controller is configured to compare the speed error with a second threshold value which is a predetermined negative (−) threshold value, and
wherein when the speed error is less than a negative (−) value less than the second threshold value, the controller is configured to perform power-off coasting control allowing vehicle deceleration with both an engine and a motor off.

4. The system of claim 3, wherein the controller is configured to check during the power-off coasting control, whether the speed error is in a converging state in which the speed error is changing in a direction of approaching zero, and
wherein when the speed error is not in the converging state, the controller is configured to generate a motor regeneration torque command which is a negative (−) torque command to perform torque command lowering control allowing vehicle deceleration by motor regeneration torque.

5. The system of claim 4, wherein when it is determined that the speed error is in the converging state, the controller is configured to maintain the power-off coasting control.

6. The system of claim 4, wherein the operation mode further includes a normal mode for controlling a vehicle speed to follow the target speed set by the driver in the cruise mode-on state, and
wherein, in the normal mode, the controller is configured to:
calculate, as a torque command for normal-mode cruise control, a torque command of the vehicle driving source for vehicle speed control following the target speed,
compare the motor regeneration torque command during the torque command lowering control with the torque command for normal-mode cruise control which is the calculated torque command, and
when the motor regeneration torque command is less than the torque command for normal-mode cruise control, switch to the normal-mode cruise control for generating the torque command of the vehicle driving source for the vehicle speed control following the target speed.

7. The system of claim 6, wherein when it is determined that the speed error is in the converging state, the controller is configured to maintain the power-off coasting control.

8. A cruise control system for a vehicle, the system comprising:
a first input unit configured to receive a driver's input of cruise mode on and off of the vehicle;
a second input unit configured to receive the driver's input of an operation mode of the vehicle, wherein the operation mode includes an eco mode for performing driving control prioritizing fuel consumption reduction; and
a controller configured to:
receive signals indicative of driver inputs from the first input unit and the second input unit to determine on and off states of a cruise mode and the operation mode selected by the driver and performing cruise control of the vehicle based on the operation mode selected by the driver in a cruise mode-on state;
when the cruise mode on and the eco mode are selected by the driver, compare a speed error with a first threshold value that is a predetermined positive (+) threshold value; wherein the speed error a value obtained by subtracting a current vehicle speed from a target speed;
when the speed error is a positive value greater than the first threshold value, perform engine torque control for vehicle acceleration, wherein the controller is configured to generate and output engine torque of an optimal operating line (OOL) as an engine torque command during the engine torque control;
check during the engine torque control, whether the speed error is in a converging state in which the speed error is changing in a direction of approaching zero; and
when the speed error is not in the converging state, perform torque command raising control which raises the engine torque command.

9. The system of claim 8, wherein when it is determined that the speed error is in the converging state, the controller is configured to maintain the engine torque control.

10. The system of claim 8, wherein the operation mode further includes a normal mode for controlling a vehicle speed to follow the target speed set by the driver in the cruise mode-on state, and
wherein, in the normal mode, the controller is configured to:
calculate, as a torque command for normal-mode cruise control, a torque command of a vehicle driving source for vehicle speed control following the target speed,
compare the raised engine torque command during the torque command raising control with the torque command for normal-mode cruise control which is the calculated torque command, and
when the raised engine torque command is greater than the torque command for normal-mode cruise control, switch to the normal-mode cruise control for generating the torque command of the vehicle driving source for the vehicle speed control following the target speed.

11. A cruise control method for a vehicle, the method comprising:
determining, by a controller, whether the vehicle is in a cruise mode-on state;
determining, by the controller, an operation mode of the vehicle selected by a driver, wherein the operation mode includes an eco mode for performing driving control prioritizing fuel consumption reduction; and
when it is determined that the vehicle is in the cruise mode-on state, performing, by the controller, cruise control of the vehicle for the operation mode selected by the driver,
when the eco mode is selected by the driver in the cruise mode-on state, comparing, by the controller, a speed error with a first threshold value that is a predetermined positive (+) threshold value, wherein the speed error a value obtained by subtracting a current vehicle speed from a target speed;
when the speed error is a positive value greater than the first threshold value, Performing, by the controller, engine torque control for vehicle acceleration by generating and outputting engine torque of an optimal operating line (OOL) as an engine torque command during the engine torque control;

when the speed error is equal to or less than the first threshold value, comparing, by the controller, the speed error with a second threshold value which is a predetermined negative (−) threshold value; and when the speed error is less than a negative (−) value less than the second threshold value, performing, by the controller, power-off coasting control allowing vehicle deceleration with both an engine and a motor off.

12. The method of claim 11, wherein the operation mode further includes a normal mode for controlling a vehicle speed to follow a target speed set by the driver in the cruise mode-on state, and wherein when it is determined that the driver has selected the normal mode, the method comprises generating, by the controller, a torque command of a vehicle driving source for vehicle speed control following the target speed, thus performing normal-mode cruise control.

13. The method of claim 11, wherein further comprising turning off a motor as a vehicle driving source during the engine torque control such that the vehicle is accelerated only by the engine torque.

14. The method of claim 11, further comprising:

checking, by the controller checks during the engine torque control, whether the speed error is in a converging state in which the speed error is changing in a direction of approaching zero, and when the speed error is not in the converging state, performing, by the controller, torque command raising control which raises the engine torque command.

15. The method of claim 14, wherein the operation mode further includes a normal mode for controlling a vehicle speed to follow the target speed set by the driver in the cruise mode-on state, and wherein, in the normal mode, the method further comprises:

calculating, as a torque command for normal-mode cruise control, a torque command of a vehicle driving source for vehicle speed control following the target speed, comparing the raised engine torque command during the torque command raising control with the torque command for normal-mode cruise control which is the calculated torque command, and when the raised engine torque command is greater than the torque command for normal-mode cruise control, switching to the normal-mode cruise control for generating the torque command of the vehicle driving source for the vehicle speed control following the target speed.

16. The method of claim 11, further comprising checking, during the power-off coasting control, whether the speed error is in a converging state in which the speed error is changing in a direction of approaching zero.

17. The method of claim 16, wherein when the speed error is not in the converging state, the method further comprises generating, by the controller, a motor regeneration torque command which is a negative (−) torque command to perform torque command lowering control allowing vehicle deceleration by motor regeneration torque.

18. The method of claim 17, wherein the operation mode further includes a normal mode for controlling a vehicle speed to follow the target speed set by the driver in the cruise mode-on state.

19. The method of claim 18, wherein, in the normal mode, the method further comprises:

calculating, as a torque command for normal-mode cruise control, a torque command of a vehicle driving source for vehicle speed control following the target speed; and comparing the motor regeneration torque command during the torque command lowering control with the torque command for normal-mode cruise control which is the calculated torque command.

20. The method of claim 19, wherein when the motor regeneration torque command is less than the torque command for normal-mode cruise control, the method further comprises switching to the normal-mode cruise control which generates the torque command of the vehicle driving source for the vehicle speed control following the target speed.

* * * * *